(12) United States Patent
Asahara et al.

(10) Patent No.: US 10,751,876 B2
(45) Date of Patent: Aug. 25, 2020

(54) MOVING ROBOT, METHOD OF CONTROLLING MOVING ROBOT, AND CONTROL PROGRAM

(71) Applicant: TOYOTA JIDOSHA KABUSHIKI KAISHA, Toyota-shi, Aichi-ken (JP)

(72) Inventors: Yoshiaki Asahara, Nagoya (JP); Hideki Kajima, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 322 days.

(21) Appl. No.: 15/864,050

(22) Filed: Jan. 8, 2018

(65) Prior Publication Data
US 2018/0215040 A1 Aug. 2, 2018

(30) Foreign Application Priority Data
Feb. 1, 2017 (JP) .................. 2017-016760

(51) Int. Cl.
*G05B 19/04* (2006.01)
*G05B 19/18* (2006.01)
(Continued)

(52) U.S. Cl.
CPC ............ *B25J 9/1666* (2013.01); *B25J 5/007* (2013.01); *B25J 9/1661* (2013.01); *B25J 9/1676* (2013.01);
(Continued)

(58) Field of Classification Search
CPC ........ B25J 19/021; B25J 5/007; B25J 9/1661; B25J 9/1666; B25J 9/1676; B25J 9/1694; G05B 2219/40202; G05D 1/0214; G05D 2201/0216; Y10S 901/01; Y10S 901/09; Y10S 901/27; Y10S 901/31; Y10S 901/46; Y10S 901/49
See application file for complete search history.

(56) References Cited

U.S. PATENT DOCUMENTS

| 10,404,327 B2 * | 9/2019 | Inaba ............ H04W 4/023 |
| 2007/0124024 A1 * | 5/2007 | Okamoto ........... B25J 5/007 700/245 |

(Continued)

FOREIGN PATENT DOCUMENTS

| EP | 1 796 079 A1 | 6/2007 |
| JP | 64-016395 A | 1/1989 |
| WO | 2016/076980 A1 | 5/2016 |

*Primary Examiner* — Harry Y Oh
(74) *Attorney, Agent, or Firm* — Sughrue Mion, PLLC

(57) ABSTRACT

A moving robot including: actuators at least including a motor for movement; a reading unit configured to read a tag installed in an environment, at least one of information on an allowable operation time of the actuators and information on an allowable operation amount of the actuators being described in the tag; and a controller configured to prohibit or limit execution of a predetermined task whose execution has already been accepted, the predetermined task being operated using at least one of the actuators, until the time when the reading unit reads the tag, and release the prohibition or the limitation and execute the task in such a way that an operation time and an operation amount do not exceed the allowable operation time and the allowable operation amount described in the tag after the reading unit has read the tag is provided.

8 Claims, 6 Drawing Sheets

(51) Int. Cl.
*B25J 9/16* (2006.01)
*B25J 5/00* (2006.01)
*G05D 1/02* (2020.01)
*B25J 19/02* (2006.01)

(52) U.S. Cl.
CPC .......... *B25J 9/1694* (2013.01); *B25J 19/021* (2013.01); *G05D 1/0214* (2013.01); *G05B 2219/40202* (2013.01); *G05D 2201/0216* (2013.01); *Y10S 901/01* (2013.01); *Y10S 901/09* (2013.01); *Y10S 901/27* (2013.01); *Y10S 901/31* (2013.01); *Y10S 901/46* (2013.01); *Y10S 901/49* (2013.01)

(56) References Cited

U.S. PATENT DOCUMENTS

| | | | |
|---|---|---|---|
| 2009/0021351 A1* | 1/2009 | Beniyama | G06K 7/0008 340/10.1 |
| 2016/0062345 A1* | 3/2016 | Stubbs | B25J 5/00 701/2 |

\* cited by examiner

AT TIME OF LIMITING OPERATIONS

| | |
|---|---|
| CART MOVING SPEED | 0.6m/s |
| HEIGHT IN MOVEMENT | 1.5m |
| DIAMETER IN MOVEMENT | 2.0m |
| ARM OPERATION SPEED | 0.5m/s |
| ARM OPERATION DIAMETER | 2.0m |
| IMAGE AUTHENTICATION | NOT PERMITTED |
| VOICE RECOGNITION | NOT USED |

MOVING ROBOT, METHOD OF CONTROLLING MOVING ROBOT, AND CONTROL PROGRAM

CROSS REFERENCE TO RELATED APPLICATIONS

This application is based upon and claims the benefit of priority from Japanese patent application No. 2017-16760, filed on Feb. 1, 2017, the disclosure of which is incorporated herein in its entirety by reference.

BACKGROUND

The present invention relates to a moving robot, a method of controlling the moving robot, and a control program.

Techniques for giving a task to an autonomous moving robot and causing the moving robot to execute the task have been known. There is a case in which a space in which the moving robot can move is shared by another apparatus. Techniques for prohibiting a moving robot from moving through a specific spatial area in the above case have been known (see, for example, Japanese Unexamined Patent Application Publication No. S64-16395).

SUMMARY

In recent years, more and more moving robots have been designed to move through a human activity space. In the human activity space, securing the human's safety is the most crucial issue. However, enlarging a space where movement and operations of the moving robot are prohibited or limited more than necessary in order to secure the human's safety causes a decrease in productivity of the moving robot. In particular, the situation of the human activity space changes with time depending on the utilization form, the utilization time band etc. of this space. Changing the spatial area that has been programmed where the movement and the operations of the moving robot are prohibited or restricted in order to improve the productivity of the moving robot requires extremely troublesome work.

The present invention has been made in order to solve the aforementioned problem, and aims to improve the productivity of the moving robot in a simple manner in accordance with the situation of the operating space as well as securing the human's safety.

A moving robot according to a first aspect of the present invention includes: actuators at least including a motor for movement; a reading unit configured to read a tag installed in an environment, at least one of information on an allowable operation time of the actuators and information on an allowable operation amount of the actuators being described in the tag; and a controller configured to prohibit or limit execution of a predetermined task whose execution has already been accepted, the predetermined task being operated using at least one of the actuators, until the time when the reading unit reads the tag, and release the prohibition or the limitation and execute the task in such a way that an operation time and an operation amount do not exceed the allowable operation time and the allowable operation amount described in the tag after the reading unit has read the tag.

According to the moving robot thus formed, a user and an administrator are able to change the operation time and the operation amount allowed for the moving robot by only replacing tags in accordance with the situation of the space in which the moving robot operates. That is, the operability of the moving robot can be improved in accordance with the situation of the operating space. Further, in a normal operation until the time when the tag is read, the prohibition or the limitation is imposed on the execution of the task, thereby prioritizing the human's safety. Further, since the monitoring target is at least one of the operation time and the operation amount of the actuator, it is possible to monitor the operation time and the operation amount using only a timer and a sensor that are highly reliable, and to reduce the probability that unexpected movement and operations occurring due to a failure or a malfunction occur.

Further, in the aforementioned moving robot, the controller may start counting time after the moving robot has reached a position in which the task can be executed when the allowable operation time is described in the tag. By defining the timing when the time is started to be counted as stated above, the location where the tag is attached can be set in a flexible manner.

Further, in the aforementioned moving robot, when the operation time and the operation amount have reached the allowable operation time and the allowable operation amount described in the tag after the prohibition or the limitation is released and the execution of the task is started but before the execution of the task is completed, the controller may interrupt the execution of the task and execute processing of terminating the task that has been interrupted. In this case, when the moving robot has conveyed a conveyance object as the task, the controller may control, as termination processing, the moving robot in such a way that the moving robot places the conveyance object in a predetermined position. Further, the controller may control the motor for movement in such a way that the moving robot stays in the position in which the operation time and the operation amount have reached the allowable operation time and the allowable operation amount described in the tag.

The moving robot according to the present invention releases limitations or the like based on at least one of the operation time and the operation amount of the actuator to be monitored independently from the task, not permitting or prohibiting each operation of the task by looking into the contents of the task. Therefore, even in a case in which, for example, the execution of the task is interrupted while the moving robot is grasping the conveyance object, it is possible to take safety measures including placing the conveyance object at an appropriate place. Further, even in a case in which, for example, the allowable operation time has passed while the moving robot is travelling on an inclined surface, the motor of the moving robot is controlled to stay the moving robot at the site to prevent the moving robot from falling off the slope.

Further, an operating limitation regarding an operation of the actuators can be described in the tag, and the controller of the moving robot may execute the task in such a way as to satisfy the operating limitation when the operating limitation is described in the tag. By giving the operating limitation as described above, it is possible to achieve execution of the task in accordance with a larger variety of space situations.

A method of controlling a moving robot according to a second aspect of the present invention is a method of controlling the moving robot, the moving robot including actuators at least including a motor for movement, the method including the steps of: accepting an execution instruction of a predetermined task operated using at least one of the actuators; prohibiting or limiting the execution of the task; reading a tag installed in an environment, at least one of information on an allowable operation time of the actuators and information on an allowable operation amount of the actuators being described in the tag; and releasing the prohibition or the limitation and executing the task in such a way that an operation time and an operation amount do not exceed the allowable operation time and the allowable operation amount described in the tag.

Further, a control program of a moving robot according to a third aspect of the present invention is a control program of a moving robot, the moving robot including actuators at least including a motor for movement, the control program of the moving robot causing a computer to execute the following steps of: accepting an execution instruction of a predetermined task operated using at least one of the actuators; prohibiting or limiting the execution of the task; reading a tag installed in an environment, at least one of information on an allowable operation time of the actuators and information on an allowable operation amount of the actuators being described in the tag; and releasing the prohibition or the limitation and executing the task in such a way that an operation time and an operation amount do not exceed the allowable operation time and the allowable operation amount described in the tag.

According to the aspects of the aforementioned control method and control program, effects similar to those obtained in the moving robot according to the first aspect may be obtained.

According to the present invention, it is possible to improve the productivity of the moving robot in a simple manner in accordance with the situation of the operating space as well as securing the human's safety.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, the present invention will be explained with reference to an embodiment of the present invention. However, the invention set forth in claims is not limited to the following embodiment. Further, not all the components described in the embodiment may be necessary as the means for solving the problems.

Figure 1:
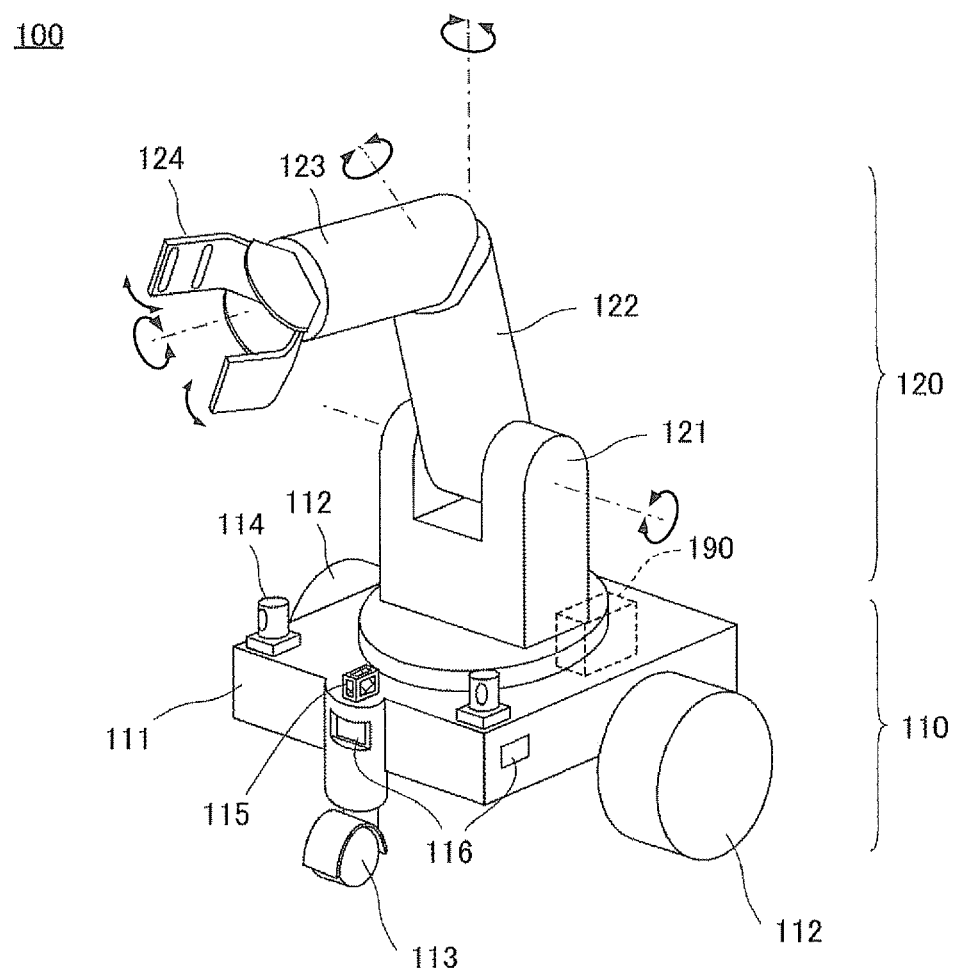
FIG. 1 is an external perspective view of a moving robot according to an embodiment.

FIG. 1 is an external perspective view of a moving robot 100 according to an embodiment. The moving robot 100 is mainly composed of a cart part 110 and an arm part 120.

The cart part 110 is mainly formed of a base 111, two driving wheels 112 attached to the base 111, and one caster 113. The two driving wheels 112 are provided in the respective opposing sides of the base 111 in such a way that the rotational axial cores thereof coincide with each other. These driving wheels 112 are rotated by a motor (not shown) independently from each other. The caster 113 is a trailing wheel, has a pivot axis extending in the vertical direction from the base 111 in such a way as to support the wheels separated away from the rotation axis of the wheels, and follows the traveling direction of the cart part 110. The moving robot 100 travels forward when, for example, the two driving wheels 112 are rotated at the same rotation speed in the same direction, and turns around the vertical axis that passes the center of gravity when these driving wheels 112 are rotated at the same rotation speed in the directions opposite from each other.

The cart part 110 includes various sensors for detecting obstacles and recognizing an ambient environment. Two of these sensors are cameras 114 installed in the front of the base 111. Each of the cameras 114 includes, for example, a CMOS image sensor, and transmits an image signal that it has captured to a controller described later. If the two cameras 114 capture one subject, parallax images can be acquired, and the controller is also able to calculate the distance to the subject. A microphone 115 is also one of the sensors. The microphone 115 transmits a voice signal that it has acquired to the controller. Upon receiving the voice signal that it has acquired, the controller is able to recognize, for example, a voice of a person who stands near the moving robot 100 and to reflect the content of the voice signal in the operation of the moving robot 100.

The cart part 110 is provided with tag readers 116 respectively provided in the front and the side thereof. The tag reader 116 reads QR code (registered trademark) printed on a tag. As will be described later, the tag reader 116 reads the tag installed in an environment and transmits the information that has been read to the controller. The moving robot 100 may drive the driving wheels 112 to cause one of the tag readers 116 to face the tag so that the tag reader 116 may be able to easily read the tag attached to, for example, the wall surface. Further, a control unit 190 is provided in the cart part 110. The control unit 190 includes a controller, a memory and the like.

The arm part 120 is mainly composed of a plurality of arms 121, 122, and 123, and a hand 124. The arm 121 has one end supported by the base 111 so as to be rotatable around the vertical axis. The arm 122 has one end supported by the other end of the arm 121 so as to be rotatable around the horizontal axis. The arm 123 has one end supported by the other end of the arm 122 so as to be rotatable in a radiation direction in the other end of the arm 122. The hand 124 is supported by the other end of the arm 123 so as to be rotatable around the central axis parallel to the extending direction of the arm 123.

The hand 124 includes a grasping mechanism so that it can grasp a conveyance object as a work object of the moving robot 100. The moving robot 100 may be applied to various purposes, not only to convey the conveyance object. The arm part 120 grasps various working objects in accordance with the task given to the moving robot 100. For example, the arm part 120 is able to perform an operation of grasping a lever and rotating the lever to open a door.

Figure 2:
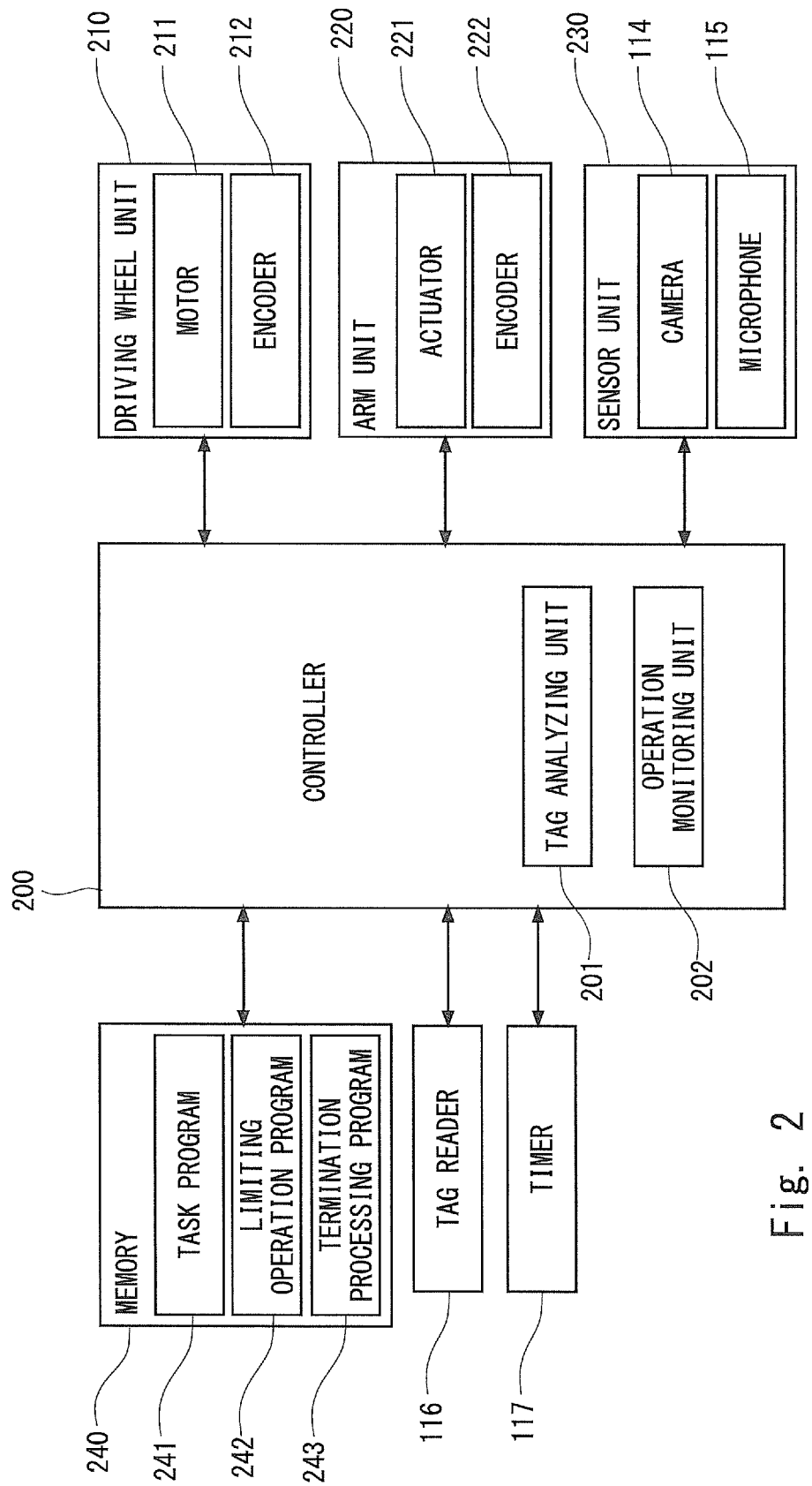
FIG. 2 is a control block diagram of the moving robot.

FIG. 2 is a control block diagram of the moving robot 100. A controller 200 is, for example, a CPU, and executes various operations related to the control of the moving robot 10 by transmitting or receiving information such as commands and sampling data to or from a driving wheel unit 210, an arm unit 220, a sensor unit 230, a memory 240, a tag reader 160 and the like.

The driving wheel unit 210 is provided in the cart part 110, and includes a drive circuit and a motor 211 for driving the driving wheels 112, an encoder 212 for detecting an amount of rotation of the motor 211 and the like. The controller 200 executes the rotation control of the motor 211 by sending a drive signal to the driving wheel unit 210. The motor 211 constitutes actuators mounted on the moving robot 100. Further, the motor 211 calculates the moving speed, the moving distance, the turning angle and the like of the moving robot 100 by receiving a detection signal of the encoder 212.

The arm unit 220 is provided in the arm part 120 and includes a drive circuit and an actuator 221 for driving the arms 121, 122, and 123 and the hand 124, an encoder 222 for detecting the operation amount of the actuator 221 and the like. The controller 200 operates the actuator 221 by sending a drive signal to the arm unit 220, and executes posture control and grasp control of the arm part 120. The actuator 221 constitutes actuators installed in the moving robot 100. Further, the actuator 221 calculates the operating speed, the operating distance, the posture and the like of the arm part 120 by receiving a detection signal of the encoder 222.

The sensor unit 230 includes, besides the camera 114 and the microphone 115, various sensors that look around the ambient environment and monitor the posture of the arm part 120. These sensors are arranged in the cart part 110 and the arm part 120 in a dispersed manner. The controller 200 sends a control signal to each of the sensors, to thereby acquire the output of these sensors. The camera 114 executes, for example, an image-capturing operation in accordance with a control signal from the controller 200 and transmits frame image data that has been captured to the controller 200.

The memory 240 is a non-volatile storage medium and may be, for example, a solid state drive. The memory 240 stores a control program for controlling the moving robot 100, various parameter values, functions, lookup tables and the like used for control. In particular, the memory 240 stores, for example, a task program 241 for executing a specific task such as a task of finding a specified object and bringing back this object. Further, the memory 240 stores a limiting operation program 242 for operating the moving robot 100 in a limited manner in a state in which the tag information has not yet been read out. Further, the memory 240 stores a termination processing program 243 for causing the moving robot 100 to execute termination processing when execution of the task program 241 has been interrupted. The details thereof will be described later.

The tag reader 116 is a QR code reader. The tag reader 116 reads the information in the QR code printed on the tag and transmits the information that has been read out to the controller 200. As will be described later, at least one of information on an allowable operation time of the actuators and information on an allowable operation amount of the actuators is described with other information in the QR code. While the tag on which the QR code is printed is used as the tag in which these information items are described in this embodiment, the medium in which these information items are described is not limited to being a QR code. An RFID may be, for example, used. When the RFID is used as the tag, an RFID reader is employed as the tag reader 116. A desired tag may be employed as long as it can be easily replaced in accordance with the situation of the space in which the moving robot 100 moves and the contents therein can be read out by simple processing.

Alternatively, the tag reader 116 may be configured to read a plurality of different types of tags. Both the QR code reader and the RFID reader may be, for example, provided as the tag reader 116. In this case, in order to secure a higher safety level, the limitations may be released as described later only when information in the QR code read out by the QR code reader and information in the RFID read out by the RFID reader coincide with each other. On the other hand, in order to increase convenience, the limitations may be released in accordance with one of the information items that has been read out.

A timer 117 is a timer for counting time, and starts counting time upon receiving a start signal from the controller 200. Further, the timer 117 sends the counted time in response to an inquiry sent from the controller 200.

The controller 200 also serves as a function operating unit that executes various operations related to control. A tag analyzing unit 201 analyzes information read out by the tag reader 116 and configures conditions for releasing prohibited or limited operations. An operation monitoring unit 202 monitors whether the task program 241 is being executed within the range of the releasing conditions that have been configured. The details thereof will be described later.

Figures 3, 4:
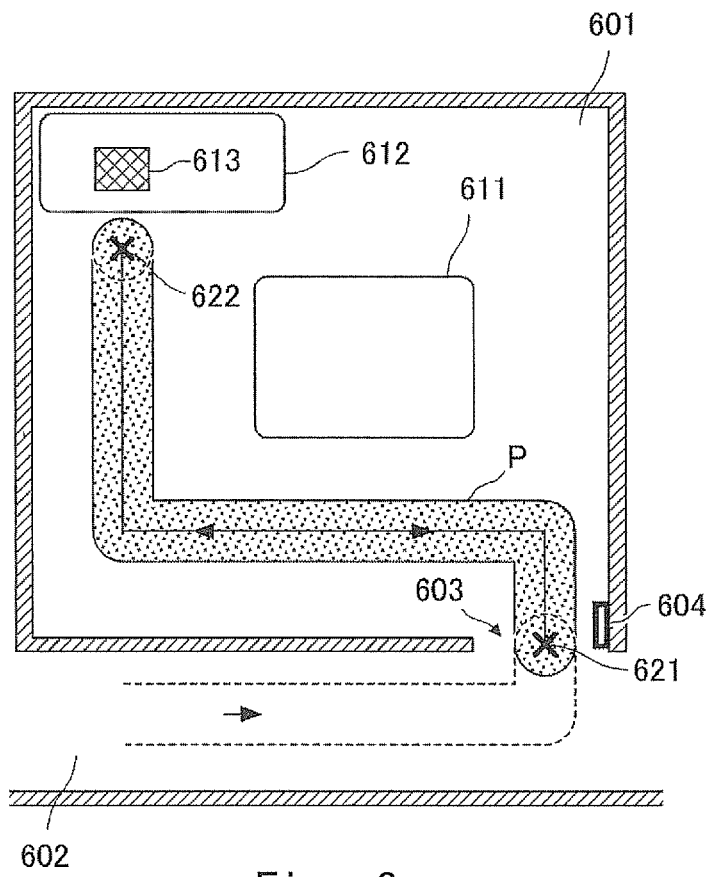
FIG. 3 is a diagram showing an example of a task and a working space in which the task is executed.
FIG. 4 is a diagram showing operation limiting conditions when a limiting operation program is executed.

FIG. 3 is a diagram showing an example of the task that the moving robot 100 executes and an example of a working space in which this task is executed. FIG. 3 shows a state in which a work area 601 in which the moving robot 100 can move and a passage area 602 when these areas are seen from above.

The work area 601 is, for example, a space divided by partitions and is one of areas in which the moving robot 100 can work. The work area 601 is connected to the passage area 602 via an entrance/exit 603.

A table 611 is placed at the center of the work area 601, and a shelf 612 is installed in the vicinity of a wall surface which is the farthest from the entrance/exit 603. It is assumed that a task of entering the work area 601 from the entrance/exit 603, moving while avoiding the table 611, grasping a conveyance object 613 placed on the shelf 612, and going back to the entrance/exit 603 is given to the moving robot 100. The specific work and operations that the moving robot 100 should execute are stored in the memory 240 as the task program 241 in advance. The user specifies the task program 241 from among a plurality of task programs prepared in advance at a timing when, for example, the moving robot 100 is started up.

The processing of the robot 100 finding a moving path while avoiding obstacles and moving along the moving path using information obtained from the camera 114, the microphone 115 and the like, recognizing the conveyance object 613, which is a target object, from articles placed on the shelf 612 and grasping the conveyance object 613 that has been recognized, and returning is described in the task program 241. When the moving robot 100 recognizes, for example, that the execution of this task program 241 has been specified while it moves along the passage area 602, the moving robot 100 heads for the entrance/exit 603. At this stage, the limiting operation program 242 is being executed and the movement and the operations allowed for the moving robot 100 are limited.

An example of operation limiting conditions when the limiting operation program 242 is executed will now be explained. FIG. 4 is a diagram showing the operation limiting conditions when the limiting operation program 242 is executed. Conditions regarding the movement of the cart part 110, conditions regarding the operation of the arm part 120, and conditions regarding the usage of the sensors of the sensor unit 230 have been mainly configured as the operation limiting conditions.

Figure 5:
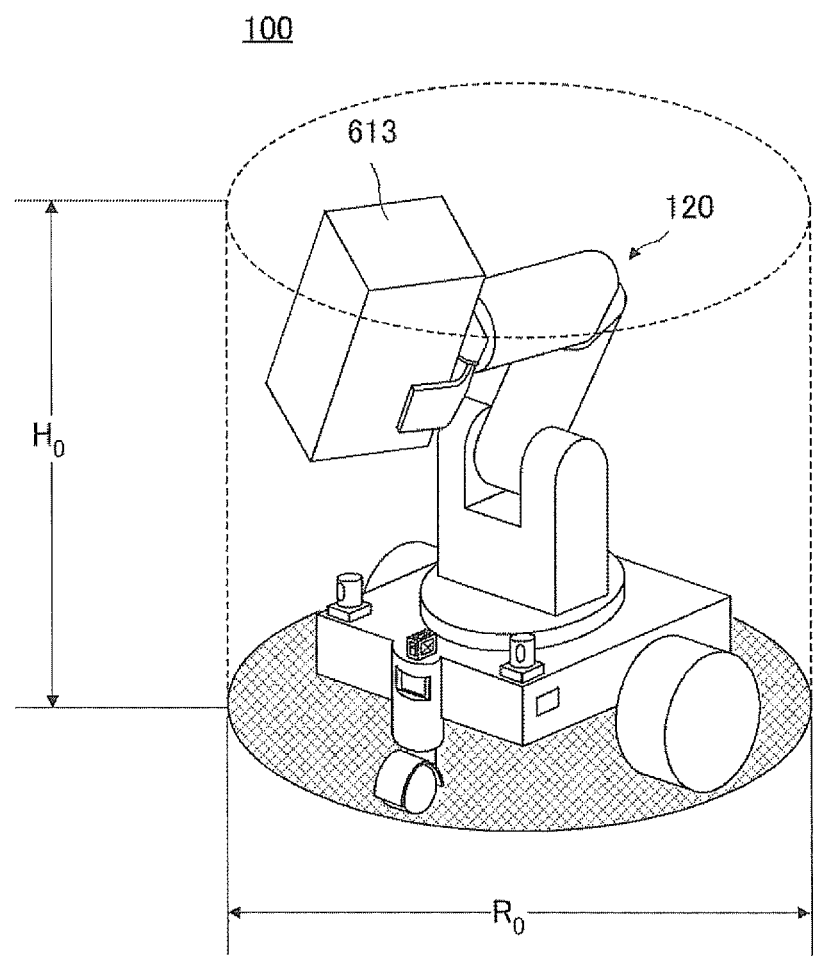
FIG. 5 is an external perspective view showing a state of the moving robot that conveys a conveyance object.

As to the conditions regarding the movement of the cart part 110, the cart moving speed is limited to be 0.6 m/s or lower. Therefore, when the limiting operation program 242 is executed, a drive signal of the motor 211 generated by the controller 200 is limited to a drive signal that instructs the speed 0.6 m/s or lower. Further, a height $H_0$ when the cart moves is limited to be 1.5 m or lower and a diameter $R_0$ when the cart moves is limited to be 2.0 m or smaller. Specifically, as shown in FIG. 5, even in a state in which the arm part 120 is grasping the conveyance object 613, it is required to contract the arm part 120 when the cart moves in such a way that the whole body of the moving robot 100 is within a columnar space having the height $H_0$ and the diameter $R_0$.

As to the conditions regarding the operation of the arm part 120, the arm operation speed is limited to be 0.5 m/s or lower and the arm operation diameter is limited to be 2.0 m or smaller. When, for example, a door is provided in the entrance/exit 603 and the arm part 120 is operated to open the door, the controller 200 needs to transmit a drive signal that satisfies this condition to the actuator 221.

As described above, by imposing limitations on the operation of the cart part 110 and the operation of the arm part 120, it is possible to operate the moving robot 100 relatively safely even in a space in which both a human and the moving robot 100 are present. That is, these limitations minimize the probability that the human in the vicinity of the moving robot 100 is injured even when this human has contacted a part of the moving robot 100.

As to the conditions regarding the usage of the sensors of the sensor unit 230, neither image authentication nor voice recognition is allowed to be used. The image authentication is used, for example, to determine, when the user gives an instruction to the moving robot 100, whether this user is included in the target persons that have been registered in advance, the moving robot 100 being configured to accept instructions from the target persons. The voice recognition is used to recognize, for example, the content of a voice instruction by the user in place of manipulation of an operation button.

As described above, by limiting processing that requires complicated calculations, it is possible to minimize malfunctions caused by calculation errors. In particular, while statistical processing and processing using probability theory may naturally cause errors, the moving robot 100 does not generate these errors since it executes the limiting operation program 242. That is, in the normal operation in which the limiting operation program 242 is executed, the moving robot 100 operates in a stable manner since it does not perform processing of outputting uncertain results.

With reference once again to FIG. 3, the explanation will be continued. When the moving robot 100 reaches a moving start point 621 in the vicinity of the entrance/exit 603, the moving robot 100 recognizes a tag 604 attached to the wall surface in the vicinity of the entrance/exit 603 by the tag reader 116. New conditions for releasing the conditions in the limiting operation described with reference to FIG. 4 and executing a task are described in the tag 604. In particular, as described above, either one of the allowable operation time of the actuators and the allowable operation amount of the actuators is described.

The tag 604 can be replaced easily. The administrator who manages the work area 601 is able to attach a first tag 604 in a time zone in which a working human is present in the work area 601 and to attach a second tag 604 in a time zone in which there is no human in the work area 601. By describing the limiting conditions for improving the safety level in the first tag 604 and describing the limiting conditions for maximizing the performance of the moving robot 100 in the second tag 604, both a high safety level and a high productivity can be achieved. When the layout of the work area 601 is changed or the usage purpose is changed, it is sufficient to configure the limiting conditions in accordance with the situation and replace the current tag 604 by another tag 604 in which the configured limiting conditions are described, thereby optimizing the operation of the moving robot 100. That is, by changing the way of achieving the execution of the task in accordance with the situation of the work area without changing the contents of the task, both a high safety level and a high productivity can be achieved.

Further, the administrator is able to not only change the operation permission conditions of the moving robot 100 but also collectively change the operation permission conditions of a large number of moving robots by attaching one tag. Further, since the administrator does not need to grasp the contents of the tasks, the administrator does not need to perform troublesome work, which is also advantageous in terms of safety management.

Further, even when the moving robot 100 has failed in reading out the information in the tag 604, the operation of the moving robot 100 is safe for the human who stays with the moving robot 100 since the moving robot 100 is kept in the state in which the operating limitations are imposed. Further, even when the operating limitations are released, since the termination processing is executed when the moving robot 100 operates for the allowed operation time and by the allowed operation amount, the probability of causing inconvenience for the human who stays with the moving robot 100 is small. That is, the moving robot 100 is configured in such a way that it is prevented from performing unexpected operations as much as possible.

Figure 6:
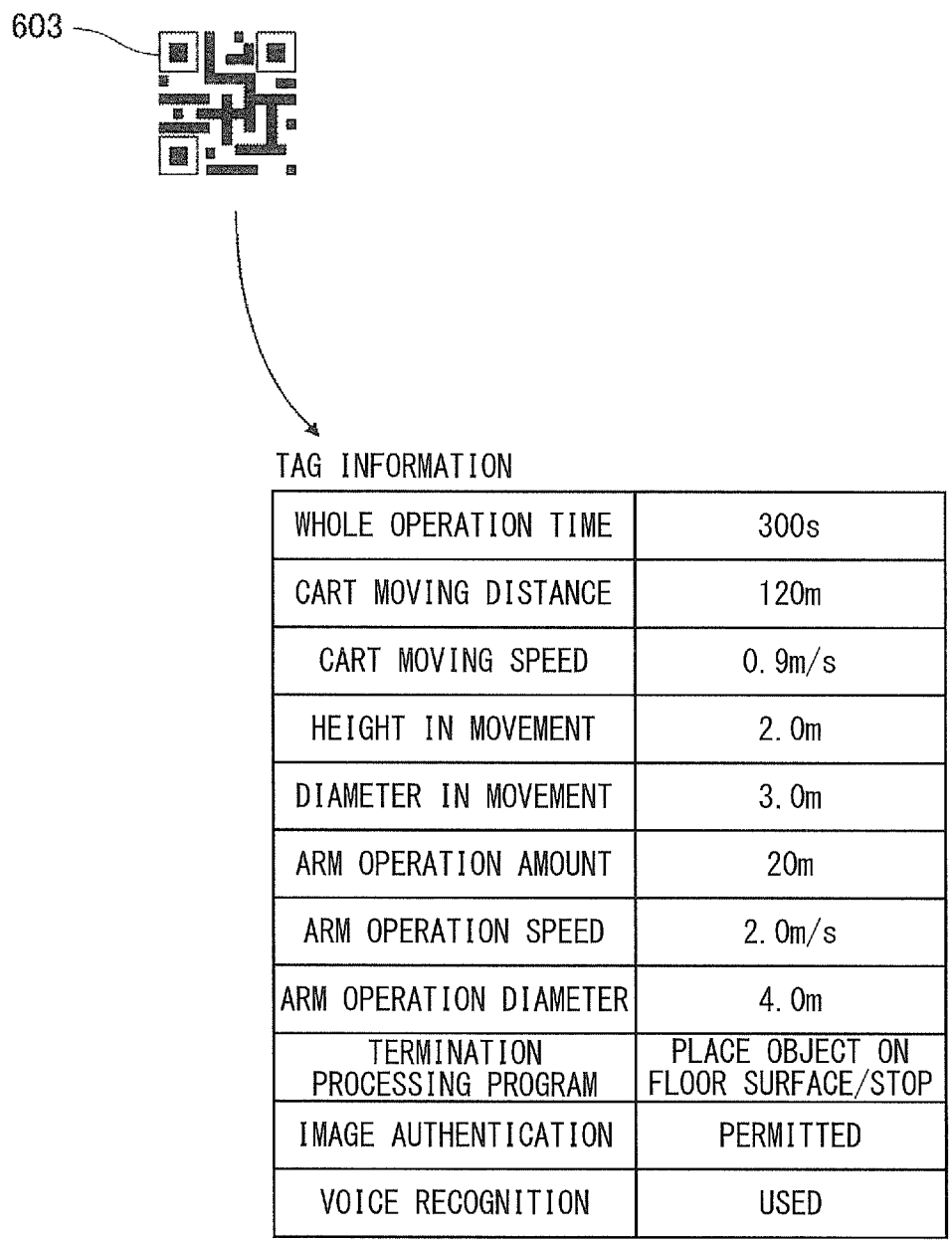
FIG. 6 is a diagram showing an example of tag information.

The operation permission conditions described as the tag information will now be explained. FIG. 6 is a diagram showing an example of the tag information read out from the tag 604. The tag information includes, besides the conditions the same as the operation limiting conditions shown in the example of FIG. 4, conditions regarding the allowable operation time and the allowable operation amount of the actuators.

The whole operation time is defined to be 300 seconds in the tag information as one allowable operation time of the actuators. That is, the prohibited matters or the limited matters of the operation limiting conditions imposed when the limiting operation program 242 is executed are released for 300 seconds after the timer 117 starts counting time as long as the following described conditions are satisfied. The whole operation time is a total time of moving the cart part 110 by the motor 211 and operating the arm part 120 by the actuator 221. The operation monitoring unit 202 acquires the output of the timer 117 to monitor whether the whole operation time that has been defined has passed. While the total time is defined in this example, the cart moving time during which the cart part 110 moves may instead be defined.

The cart moving distance is defined to be 120 m. The cart moving distance is a definition as the allowable operation amount of the motor 211. The controller 200 acquires the output of the encoder 212, integrates the moving distance, and monitors whether the integrated moving distance has reached the cart moving distance that has been defined. The cart moving speed is defined to be 0.9 m/s, the height in movement is defined to be 2.0 m, and the diameter in movement is defined to be 3.0 m. These values are defined to be equal to or larger than the respective values in the operation limiting conditions. That is, the operation limiting conditions are relieved to improve the operation efficiency.

The arm operation amount is defined to be 20 m. The arm operation amount is a definition as the allowable operation amount of the actuator 221. The controller 200 acquires the output of the encoder 222, integrates the operating distance, and monitors whether the integrated operating distance has reached the arm operation amount that has been defined. The arm operation speed is defined to be 2.0 m/s and the arm operation diameter is defined to be 4.0 m. These values are set to be equal to or larger than the respective values in the operation limiting conditions. That is, the operation limiting conditions of both the cart part 110 and the arm part 120 are relieved to improve the operation efficiency. Note that an arm operation time during which the arm part 120 is operated may be defined. The arm operation time starts to be counted when, for example, the arm part 120 has started the grasping operation.

The tag information specifies a "place object on floor surface/stop" program as the termination processing program. The termination processing program is a program executed by the controller 200 when the operation monitoring unit 202 has interrupted the execution of the task program 241 since one of the whole operation time, the cart moving distance, and the arm operation amount (when the cart moving time and the arm operation time are defined, including them as well) has reached a predetermined amount. A plurality of termination processing programs 243 are prepared in advance and are stored in the memory 240. The tag information specifies one of them.

When the "place object on floor surface/stop" program is specified as the termination processing program 243, the moving robot 100 drives the arm part 120 to execute the operation of placing the conveyance object 613 that the hand 124 grasps on the floor surface, and stops the drive of the driving wheels 112 and stays at the site at the timing when the task program 241 has been interrupted. When the moving robot 100 is positioned on an inclined surface, torque may be given to the driving wheels 112 so as to prevent the moving robot 100 from falling off the inclined surface.

When a "place object on floor surface/return" program is specified as the termination processing program 243, after the moving robot 100 places the conveyance object on the floor surface, it executes the limiting operation program 242 to return to the starting point while satisfying the operation limiting conditions. It is sufficient that the conveyance object 613 be placed in a safety position and any position other than the floor surface that is considered to be safe may be specified in advance. For example, the position that the conveyance object 613 has been originally placed may be specified or a flat part of the moving robot 100 may be specified if the size of the conveyance object 613 is relatively small.

The tag information permits image authentication and usage of voice recognition as the conditions regarding the usage of sensors of the sensor unit 230. In this regard as well, the operation limiting conditions are relieved to prioritize improvement of the operation efficiency.

Referring once again to FIG. 3, the explanation will be continued. The moving robot 100 releases the conditions for the limiting operation and executes the task program 241 in a condition described in the tag 604 from which information has been read out. The controller 200 controls the moving robot 100 in such a way that the moving robot 100 moves from the moving start point 621, passes a path P while avoiding obstacles, and reaches a grasping/working point 622 opposed to the shelf 612. When, for example, the whole operation time, that is, 300 seconds, has passed before the moving robot 100 reaches the grasping/working point 622 because the moving robot 100 has intermittently stopped due to the existence of obstacles such as the operator or when the moving distance that the moving robot 100 has moved has reached the cart moving distance, that is, 120 m, before the moving robot 100 reaches the grasping/working point 622 because the moving robot 100 has moved along an alternative path, having failed to find the path, the controller 200 executes the termination processing program 243.

The moving robot 100 finds the conveyance object 613 from the shelf 612, operates the arm part 120, and grasps the conveyance object 613 at the grasping/working point 622. Then the moving robot 100 folds the arm part 120 in such a way that the total diameter of the moving robot 100 and the conveyance object 613 does not exceed the diameter in movement $R_0$. When the operation amount of the arm part 120 has reached 20 m before this operation is completed, the moving robot 100 executes the termination processing program 243 at this stage. After the moving robot 100 completes the grasping operation, the moving robot 100 goes back to the moving start point 621 via the path P again while avoiding obstacles, and then ends the execution of the task.

When, for example, the task program 241 is divided into a task of reciprocating between the moving start point 621 and the grasping/working point 622 and a task of grasping at the grasping/working point 622, the tag information may separately define the operation permission condition for each task. When the operation permission condition is separately defined, regarding the task of performing the grasping operation, for example, the timer 117 starts counting time when the moving robot 100 has reached the grasping/working point 622. Further, regarding the task of performing the reciprocating movement, the timer 117 stops counting time while the moving robot 100 is executing the task of performing the grasping operation. That is, the time when the timer 117 starts counting time is not limited to the time when the tag reader 116 has read out the information stored in the tag 604 and may be the time when the moving robot 100 has reached the position at which it can execute the target task.

Figure 7:
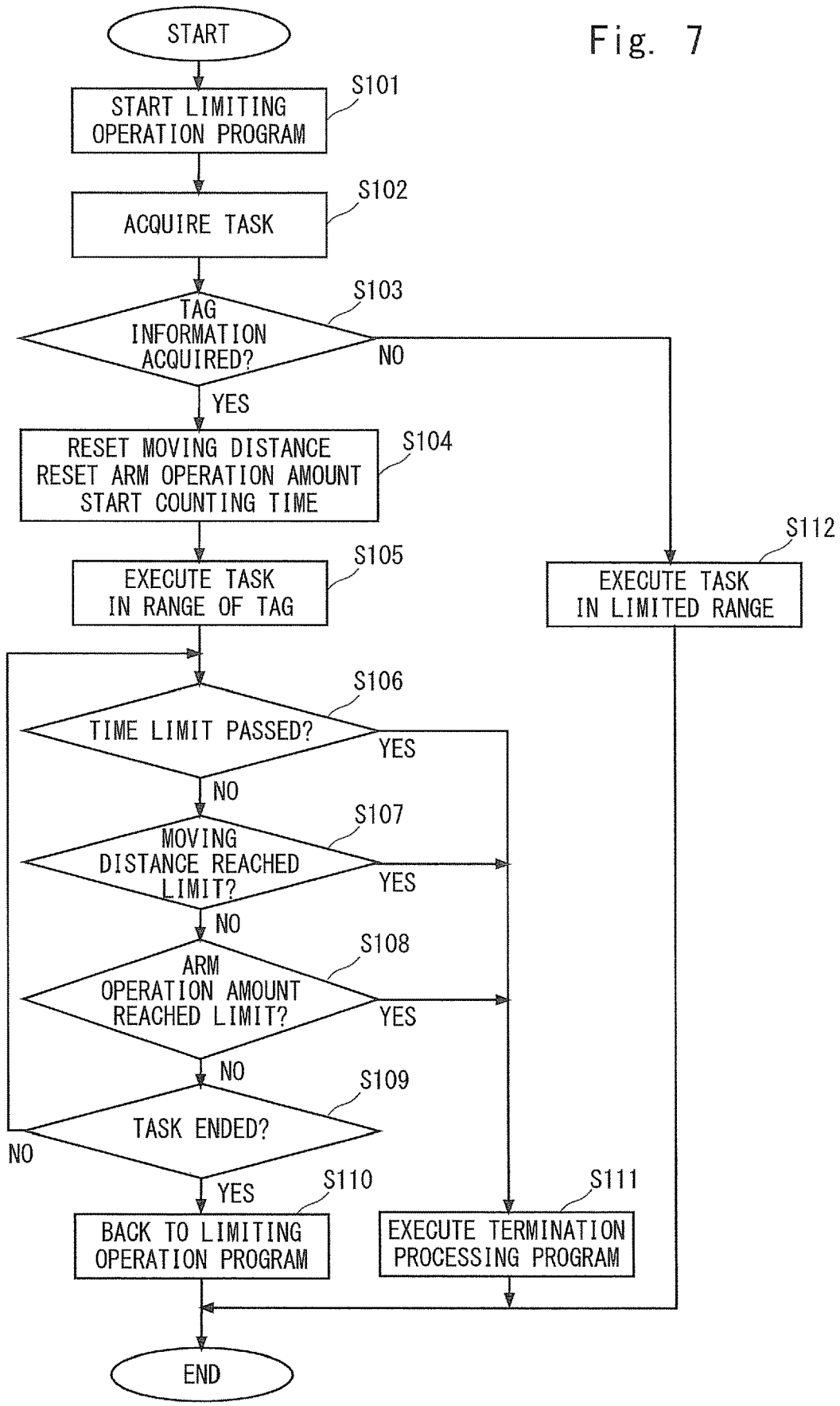
FIG. 7 is a flow diagram for describing a process flow of the moving robot.

Next, a whole process flow of the moving robot 100 will be explained. FIG. 7 is a flow diagram for describing a process flow of the moving robot. The process flow starts when, for example, the power of the moving robot 100 is turned on.

In Step S101, the controller 200 reads the limiting operation program 242 from the memory 240, and controls the moving robot 100 in accordance with the operation limiting conditions defined in the limiting operation program 242. The limiting operation program 242 may describe that the moving robot 100 should execute a specific operation such as moving around the passage area 602 when the specified task is not given. In this case, the specific operation is executed in such a way as to satisfy the operation limiting conditions that have been defined.

The controller 200 acquires a specific task in Step S102. The acquisition of the task is performed, for example, by the user selecting a specific task program 241 from the terminal apparatus. The controller 200 reads the target task program 241 from the memory 240. The controller 200 starts executing the task when the execution of this task can be started even under the operation limiting conditions set by the limiting operation program 242. The controller 200 defers initiation of the task until the time when it acquires the tag information if the task cannot be started due to some operation being prohibited.

In Step S103, the controller 200 checks whether the tag information has been acquired. If the information stored in the tag has been read out via the tag reader 116, the tag analyzing unit 201 analyzes the tag information and then the process goes to Step S104. If not, the process goes to Step S112. When the step moves to Step S112, the task is executed in the range of the operation limiting conditions and then the process is ended.

When the process goes to Step S104, the controller 200 resets the cart moving distance, resets the arm operation amount, and causes the timer 117 to start counting time. The operation monitoring unit 202, which is a function operating unit of the controller 200, starts monitoring the whole operation time, the cart moving distance and the like in accordance with the operation permission conditions that have been read out. The controller 200 goes to Step S105, releases the operation limiting conditions that have been imposed, and executes the task in the range in which the operation permission conditions of the tag information are satisfied.

While the task is being executed, the operation monitoring unit 202 checks, in Step S106, whether the time limit of the whole operation time has passed, then checks, in Step S107, whether the cart moving distance has reached a specified value, and then checks, in Step S108, whether the arm operation amount has reached a specified value. When one of these conditions is satisfied, the process goes to Step S111, where the termination processing program 243 specified as the tag information is loaded from the memory 240 and the loaded program is executed. When the execution of the termination processing program 243 is completed, the whole processing is ended.

When none of these conditions is satisfied, the process goes to Step S109. The operation monitoring unit 202 may skip Step S108 in a period in which it is clear that the task that is being executed relates to the movement of the cart part 110, not the operation of the arm part 120. In a similar way, the operation monitoring unit 202 may skip Step S107 in a period in which it is clear that the task that is being executed relates to the operation of the arm part 120, not the movement of the cart part 110.

The controller 200 checks, in Step S109, whether the task has been ended. When the task has not yet been ended, the process goes back to Step S106, where the operation monitoring unit 202 continues the monitoring operation. When the task has been ended, the process goes to Step S110, where the processing is made back to the execution of the limiting operation program 242. When the execution of the limiting operation program 242 is completed, the whole processing is ended.

While the example in which both the allowable operation time (e.g., the whole operation time) and the allowable operation amount (e.g., the cart moving distance) of the actuators have been described in the tag information has been described in the aforementioned embodiment, only one of them may be described. When the whole operation time has been described as the allowable operation time and the allowable operation amount has not been described, the operation monitoring unit 202 monitors only the whole operation time. In this case, the moving distance of the cart part 110 may become large. On the other hand, when the arm operation amount has been described as the allowable operation amount and the allowable operation time has not been described, the operation monitoring unit 202 monitors only the arm operation amount. In this case, the moving robot 100 is able to take time for recognizing the conveyance object 613 and is able to grasp the conveyance object 613 slowly but reliably.

Further, while the moving robot 100 including the arm part 120 for conveying the conveyance object has been described as an example in the aforementioned embodiment, any moving robot that has a structure including an actuator may release prohibition and limitations and execute tasks in a similar way.

Further, the items described as the tag information and the format in which the tag information is described are not limited to those described with reference to FIG. 6. For example, the grasping force of the hand 124 may be defined as the items or the movable range of the arm part 120 may be defined by coordinate values in the XYZ space, not by diameter.

Further, as a condition for executing the termination processing from the state in which the operating limitations imposed in the normal state are released or a condition for returning the state in which the operating limitations imposed in the normal state are released to the state in which the operating limitations are imposed, "an instruction by the user" may be added. When, for example, usage of voice recognition is permitted, the controller 200 returns the state in which the operation limitations are released to the state in which the operating limitations are imposed when it has recognized voice saying "stop".

While the example in which the programs executed by the controller 200 are stored in the memory 240 in advance has been described in the aforementioned embodiment, these programs may be, for example, transmitted to the moving robot 100 from an external device by radio communication. The controller 200 may develop the program acquired via a communication interface in a work memory and execute the program that has been developed as appropriate.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A moving robot comprising:
actuators at least comprising a motor for movement;
a tag reader configured to read a tag installed in an environment, wherein the tag describes an allowable information, wherein the allowable information includes at least one of an allowable operation time of the actuators or an allowable operation amount of the actuators; and a controller configured to prohibit or limit execution of a predetermined task whose execution has already been accepted, the predetermined task being operated using at least one of the actuators, until the time when the tag reader reads the tag, and release the prohibition or the limitation and execute the task in such a way that an operation time and an operation amount do not exceed the allowable information described in the tag after the tag reader has read the tag.

2. The moving robot according to claim 1, wherein, when the allowable information described in the tag includes the allowable operation time, the controller starts counting time after the moving robot has reached a position in which the task can be executed.

3. The moving robot according to claim 1, wherein the controller interrupts the execution of the task and executes processing of terminating the task that has been interrupted when the operation time and the operation amount have reached the allowable information described in the tag after the prohibition or the limitation is released and the execution of the task is started but before the execution of the task is completed.

4. The moving robot according to claim 3, wherein, when the moving robot has conveyed a conveyance object as the task, the controller controls, as the termination processing, the moving robot in such a way that the moving robot places the conveyance object in a predetermined position.

5. The moving robot according to claim 3, wherein the controller controls, as the termination processing, the motor in such a way that the moving robot stays in the position in which the operation time and the operation amount have reached the allowable information described in the tag.

6. The moving robot according to claim 1, wherein the allowable information described in the tag further includes an operating limitation regarding an operation of the actuators, and the controller executes the task in such a way as to satisfy the operating limitation.

7. A method of controlling a moving robot, the moving robot comprising actuators at least comprising a motor for movement, the method comprising the steps of:

accepting an execution instruction of a predetermined task operated using at least one of the actuators;

prohibiting or limiting the execution of the task;

reading a tag installed in an environment, wherein the tag describes an allowable information, wherein the allowable information includes at least one of an allowable operation time of the actuators or an allowable operation amount of the actuators; and releasing the prohibition or the limitation and executing the task in such a way that an operation time and an operation amount do not exceed the allowable information described in the tag.

8. A storage medium that stores a control program of a moving robot, the moving robot comprising actuators at least comprising a motor for movement, the control program of the moving robot causing a computer to execute the following steps of:

accepting an execution instruction of a predetermined task operated using at least one of the actuators;

prohibiting or limiting the execution of the task;

reading a tag installed in an environment, wherein the tag describes an allowable information, wherein the allowable information includes at least one of an allowable operation time of the actuators or an allowable operation amount of the actuators; and releasing the prohibition or the limitation and executing the task in such a way that an operation time and an operation amount do not exceed the allowable information described in the tag.

* * * * *